United States Patent [19]

Aust

[11] Patent Number: 5,754,736
[45] Date of Patent: May 19, 1998

[54] SYSTEM AND METHOD FOR OUTPUTTING SPOKEN INFORMATION IN RESPONSE TO INPUT SPEECH SIGNALS

[75] Inventor: Harald Aust, Aachen, Germany

[73] Assignee: U.S. Philips Corporation, NY, N.Y.

[21] Appl. No.: 526,017

[22] Filed: Sep. 8, 1995

[30] Foreign Application Priority Data

Sep. 14, 1994 [DE] Germany ............... 44 32 632.7

[51] Int. Cl.$^6$ .................................................. G10L 5/00
[52] U.S. Cl. ............... 395/2.61; 395/2.62; 395/2.63; 395/2.66
[58] Field of Search ................ 395/2.61, 2.62, 395/2.66, 2.52, 2.44, 2.56, 2.63

[56] References Cited

U.S. PATENT DOCUMENTS

| | | | |
|---|---|---|---|
| 4,277,644 | 7/1981 | Levinson et al. | 395/2.5 |
| 4,481,593 | 11/1984 | Bahler | 395/2.62 |
| 4,624,008 | 11/1986 | Vensko et al. | 395/2.62 |
| 4,882,757 | 11/1989 | Fisher et al. | 395/2.62 |
| 4,947,438 | 8/1990 | Paeseler | 395/2.61 |
| 5,005,203 | 4/1991 | Ney | 395/2.64 |

FOREIGN PATENT DOCUMENTS

| | | | |
|---|---|---|---|
| 4130631 | 3/1993 | Germany | G10L 5/06 |

OTHER PUBLICATIONS

Giachin, "Automatic Training of Stochastic Finite-State Language Models for Speech Understanding", Conference Proceedings of ICASSP92, San Francisco, 1992, vol. 1, pp. 1-173 to 1-176.

U.S. Application Serial No. 07/944,554, filed Sep. 14, 1992. "Method and Apparatus for Recognizing Spoken Words in a Speech Signal", specification of U.S. Application claiming priority to DE 41 30 631 A1 (presently U.S. Application No. 08/526,017).

Pieraccini et al., (Complxity Reduction in a Large Vocabulary Speech Recognizer, ICASSP'91, Jul. 1991, pp. 729-732).

Giachin (Phrase Bigrams for Continuous Speech Recognition, ICASSP'95, May 1995, pp. 225-228).

*Primary Examiner*—Allen R. MacDonald
*Assistant Examiner*—Vijay B. Chawan
*Attorney, Agent, or Firm*—Daniel E. Tierney

[57] ABSTRACT

The invention aims to make an automatic information system suitable for the input of requests which are spoken as naturally as possible and which are not subject to restrictions about which the user must be informed in advance. To this end, the system and the method are subdivided into several, essentially independently operating segments with unambiguous interfaces. A first segment serves for the recognition of words and outputs a word graph. A second segment forms a concept graph from the word graph in that essentially the word graph is searched only for word sequences wherefrom values for a database enquiry can be derived; such word sequences, or also single words, are replaced by concepts in the concept graph. In a further segment the concepts in the concept graph are bridged and gaps between the concepts are filled. A speech model is taken into account for this operation. A stochastic attributed grammar is used to determine the concepts from the word graph and to determine the meaning of the word sequences in the concepts. Because irrelevant filler words in the spoken request are ignored early on, the computational expenditure is comparatively small despite the freely pronounced requests.

12 Claims, 2 Drawing Sheets

SYSTEM AND METHOD FOR OUTPUTTING SPOKEN INFORMATION IN RESPONSE TO INPUT SPEECH SIGNALS

BACKGROUND OF THE INVENTION

The invention in general relates to a system and a method for outputting spoken information in response to input speech signals, and notably relates to an automatic information system in which answers in the form of complete sentences are output in response to spoken questions; such answers can also be requests for further particulars etc. The answers are determined via a database enquiry which is derived from the input speech signal.

Systems of this kind are notably information systems via which persons receive information in response to enquiries without an intermediary operator being required. An example in this respect is an automatic information system concerning train or airplane schedules. Known information systems often are not user friendly because in many cases the user must press given keys of the telephone or may speak only one of a few words which can be understood by the system. Therefore, such a system is often menu-controlled and accompanied by extensive explanatory information. Systems which accept substantially unconstrained speech, i.e. natural speech, have also been described, for example in the Conference Proceedings of ICASSP92, San Francisco, 1992, Vol. 1, pp. 1-173 to 1-176, but such systems do not operate very reliably.

SUMMARY OF THE INVENTION

It is an object of the invention to provide a system of the kind set forth which operates with a high reliability for input of substantially natural speech containing the customary deviations such as grammatically incorrect or incomplete sentences.

In a system for outputting spoken information in response to input speech signals entered this object is achieved mainly in that first words possibly contained in the speech signal are determined and a word graph is formed wherefrom subsequently a concept graph is formed in which word sequences or individual words are replaced by predetermined concepts by application of an attributed context-free stochastic grammar to the word graph, values for said concepts being determined from the words in the word graph. Ultimately an optimum path, notably the sequence of concepts with the most favourable score in the concept graph, is determined by way of scores which are transferred from the word graph to the concept graph and which are complemented by speech model values; data for a database enquiry are derived from the associated values of the concepts in this sequence. This enables simple determination of the parts of the input speech signal which are necessary for the formation of the database enquiry; irrelevant parts of the speech signal are not used further so that they do not burden further processing.

The invention also includes a method for outputting spoken information in response to input speech signals, comprising the following steps: comparing the speech signals with stored reference signals which correspond to words, and outputting words determined by the comparisons, together with a score and with statements as regards starting point and end point for each word output, and storing the words output with the statements in order to form a word graph from consecutive words; replacing predetermined word sequences in the word graph by predetermined concepts with a score which is derived from the sum of the scores of the words of the word sequence replaced, and also with the same starting and end points as the relevant replaced word sequence forming a concept graph and determining values from the replaced word sequences for the individual concepts in the concept graph; determining a sequence of concepts from the concept graph on the basis of the scores; and converting the values in the concepts of the sequence into data for a database enquiry in order to control a memory which contains predetermined words or word sequences, and outputting selected word sequences in the form of complete sentences.

Improvements are feasible in that speech pauses in the input speech signal are recognized and removed from the word graph before formation of the concept graph. It is also possible to introduce so-called filler concepts which make it easier to circumvent possibly incorrectly recognized concepts and to interconnect incoherent concepts, i.e. concepts wherebetween gaps exist in the concept graph. Furthermore, it is attractive to transfer not only the scores from the word graph to the concept graph, but also to assign additional scores, based on a speech model for the concepts, to the concept graphs. The optimum path can thus be more reliably determined.

These and other aspects of the invention will be apparent from and elucidated with reference to the embodiment described hereinafter.

DESCRIPTION OF THE PREFERRED EMBODIMENTS

In the case of a request for information whose contents are determined via a database enquiry, given values or data must be derived from the spoken request in order to carry out the database enquiry. In the exemplary application to be described hereinafter, concerning a request for information regarding a train timetable, such values or data are, for example the point of departure, the destination, the date, the earliest or latest time of departure, etc. If the database enquiry is to be derived from a spoken sentence, the problem consists in the determination of the necessary values. First the spoken sentence must then be recognized and the meaning of the recognized sentence must be extracted therefrom; thus, in addition to recognition a kind of automatic understanding is required.

The embodiment of an information system in accordance with the invention as described hereinafter is based on the following basic ideas:

Recognition and understanding take place successively in separate modules, a word graph serving as the interface. The "understanding" module serves to find the best path through the word graph and to determine its meaning. The understanding module itself is subdivided into components with a defined interface which are to be successively executed. As a result, a complex, calculation-intensive and error-prone communication of the individual modules is reduced to a bare minimum and, moreover, given parts of the system can be readily modified, independently of the other parts.

The input items required for a database enquiry are practically always expressed by elements of a comparatively limited number of word sequences, for example "nach<Bahnhof>" ("to <railway station>") in order to state the destination. Word sequences of this kind are referred to as concepts and may be arranged in an arbitrary order and be separated by filler words, without the respective meanings being changed thereby. Therefore, it is not necessary to process a spoken sentence completely; it suffices to trace such concepts on the basis of the predetermined word sequences. As a result, the enquiry need not be posed in a given form and, moreover, grammatically incorrectly spoken or incorrectly recognized input sentences can often be at least partly processed.

The search for the best path takes into account only the scores of the words, or parts of the sentence, in the form of concepts; this corresponds to the syntax of the sentence: In this case, however, the meaning of the sentence is not taken into account. The arithmetic work is thus clearly reduced.

For the speech model an attributed context-free stochastic grammar is used. This enables simple determination of the relevant parts of the spoken sentence as well as calculation of their meaning.

Figure 1:
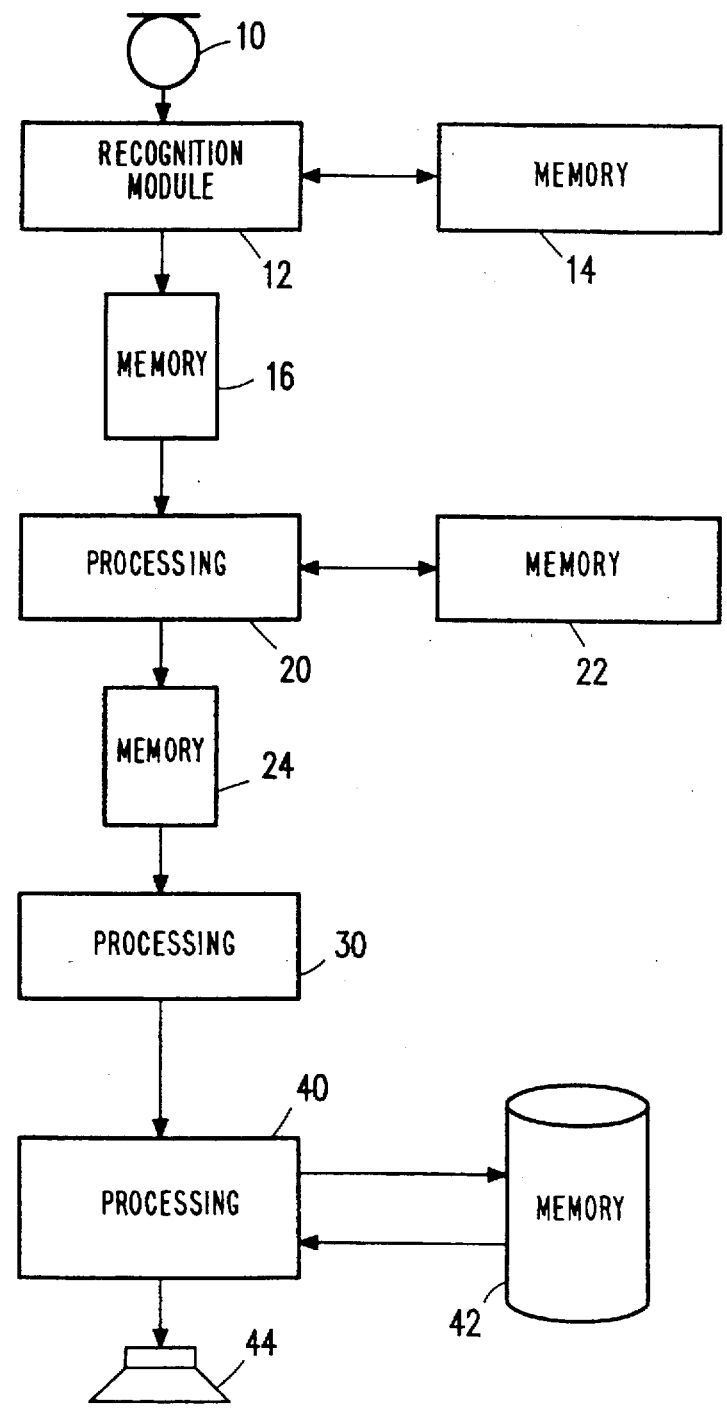
FIG. 1 shows a block diagram of the system in accordance with the invention.

The basic subdivision between recognition module and understanding module is apparent from the block diagram of FIG. 1. The recognition module is represented essentially by the block 12 which receives the speech signal picked up via the microphone 10. The customary means for preprocessing the speech signal, such as digitization and spectrum decomposition of the speech signal, have been omitted for the sake of simplicity. The preprocessed speech signals are compared with reference signals from a reference memory 14 in the block 12; the reference memory is activated by the unit 12 and supplies reference signals for the comparisons. An example of such a unit 12 for word recognition is described in DE 41 30 631 A1, to which U.S. application Ser. No. 07/944,544, filed Sep. 14, 1992, corresponds.

Figure 2:
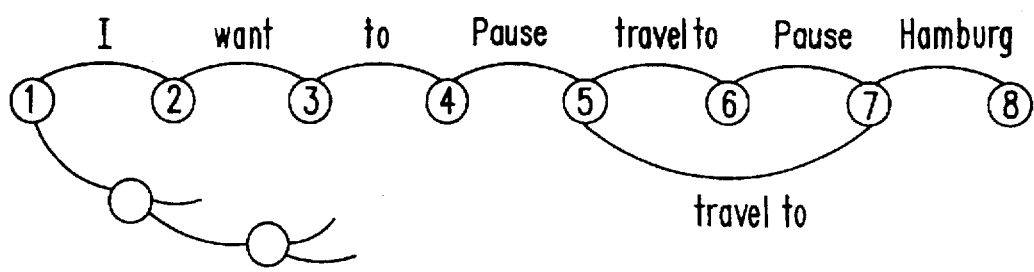
FIGS. 2 and 3 show two forms of an exemplary word graph.

The word recognition in the block 12 offers a provisional result in the form of a word graph, a simplified example of which is shown in FIG. 2. A word graph is a directed graph whose nodes are marked by a respective instant and whose edges are marked by a word and a score, being a measure of the probability of this word having been spoken in the speech signal between the instants corresponding to the nodes at the two ends of the word. In the described example the negative logarithm of this probability is used as the score, so that the individual scores of several words can be successively added; however, other measures can also be used for the score. Each path through the graph corresponds to a given word sequence and the sum of the associated scores represents a probability for this word sequence. In FIG. 2 the nodes are represented by numbered circles, essentially only one path through the graph being shown in detail. Normally speaking, however, many other edges, corresponding notably to similarly sounding words, emanate from the starting node and all further nodes.

The edges denoted by the reference "Pause" represent a special case, because they are actually not a word and are recognized as a pause. When a word graph is searched for meaningful word sequences, to be replaced by concepts, in the word graph individual words of such word sequences may be separated by at least one pause, so that they are not readily recognized as belonging together. This problem can be solved in the easiest way by bridging all pauses, without expanding or reducing the contents of the word graph.

Therefore, for each edge which is marked by a reference other than Pause and from the end nodes of which at least one edge denoted by the reference Pause emanates, a new edge with the same word is inserted in the word graph, which new edge by-passes both said edges. Its score is then obtained from the scores of the two by-passed edges, i.e. as the sum of these two scores if each score indicates the negative logarithm of the probability of the relevant element or word. When pauses are eliminated in this manner and the nodes are traversed in an ascending order, it is at the same time ensured that a succession of pause edges is also taken into account.

Figure 3:
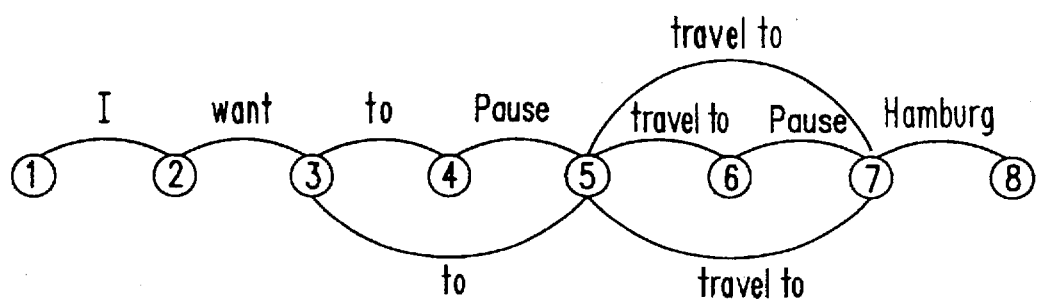

The word graph then obtained is shown in FIG. 3. Therein, the edge "nach" ("to") from the node 3 to the node 4 and the edge "Pause" from the node 4 to the node 5 are bridged by a new edge, bearing the designation "nach" ("to") from the node 3 to the node 5. This new edge is given a score which is equal to the sum of the scores of the two edges, i.e. of the word and the pause. Analogously, a new edge is also inserted from the node 5 to the node 7; this new edge eliminates the edge "Pause" from the node 6 to the node 7. Such a word graph is output by the block 12 and buffered in the memory 16 for further processing.

Such further processing takes place in the block 20 in which a concept graph is formed from the word graph in the memory 16. To this end, the word graph is searched for given word sequences with which concepts are associated. This corresponds to the application of a given grammar to the word graphs, i.e. an attributed context-free stochastic grammar which at the same time serves as a speech model, i.e. which supplies additional scores for concepts and possibly sequences of concepts. This grammar is stored in the form of key words and rules in the block 22. The searching of the word graph for given word sequences (such a word sequence may also consist of a single word) can be simplified in various ways. For example, given key words can be searched for word sequences, for example the word "nach" ("to"); in that case it is checked whether this word is succeeded by the name of a railway station included in a list. The same holds for the date for which inter alia the preposition "am" ("on"), succeeded by at least one ordinal, is searched.

The concept graph corresponds to the associated word graph in as far as that it contains the same nodes, i.e. no additional nodes but rather a few nodes less. The edges in the concept graph, however, are not denoted by individual words but by concepts. All edges or sequences of edges of the original word graph which do not belong to a concept are absent, however. Like the edges in the word graph, the edges in the concept graph are given scores which are derived from the scores of the word sequence in the word graph associated with the relevant concept, i.e. by addition of the scores of the individual words in the word sequence.

The reliability is substantially enhanced when a further score which results from the speech model probability of the grammar is assigned to the scores of the edges in the concept graph. This further score is added to the score obtained from the word graph. The value of the speech model probability follows from the stochastic grammar used in that a probability value which indicates the probability of use of the relevant rule is assigned to each rule within the grammar. Addition of the values of all rules involved in the relevant grammar enables determination of their probability which then produces practically the speech model probability which is added to the associated edge in the concept graph.

Figure 4:
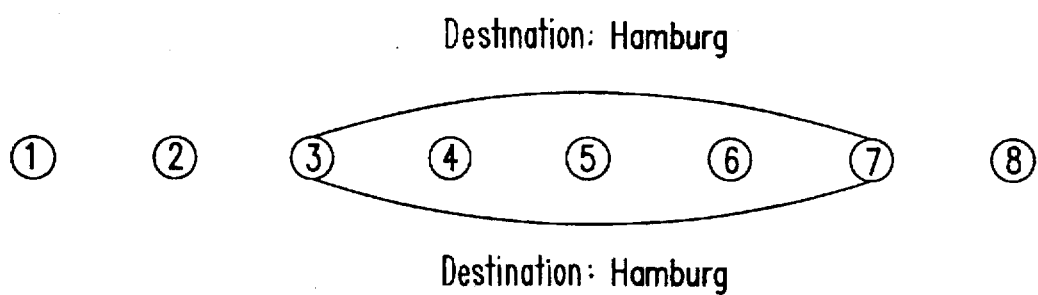
FIGS. 4 and 5 show two forms of an exemplary concept graph.

FIG. 4 shows a concept graph thus derived from the word graph shown in FIG. 3; the score has again been omitted at the edges for the sake of clarity. However, this Figure reveals the problem that in the concept graph, being composed of real requests which evidently have a much more complex composition, a coherent path no longer extends from the starting node to the end node of the graph, because various concepts no longer adjoin one another without a gap. A further problem which, however, is not directly evident from FIG. 4, consists in that a concept found from the word graph need not actually have been spoken, because it may also have arisen from incorrect recognition, notably in the case of dense word graphs. Therefore, a possibility is indicated to bridge not only gaps in the concept graph but also individual concepts.

To this end, so-called filler concepts are introduced. Such filler concepts do not contain items used for the database enquiry and, therefore, no grammar with rules is applicable to these filler concepts. The filler concepts are used to form edges which bridge gaps between two arbitrary concepts, including concepts which are situated far apart and wherebetween other concepts are situated, and also edges which bridge concepts present. These filler concept edges are also given scores which are initially equal to the sum of the scores of the words in a word sequence of the word graph which corresponds to the relevant filler concept edge. In most cases the word graph contains several word sequences whose positions correspond to the filler concept edge, so that the word sequence having the smallest sum of the scores is then used and the other word sequences are ignored.

Filler concept edges of this kind are inserted into the concept graph, but the number of filler concept edges formed is not greater than absolutely necessary; notably filler concept edges extending in parallel do not occur.

Figure 5:
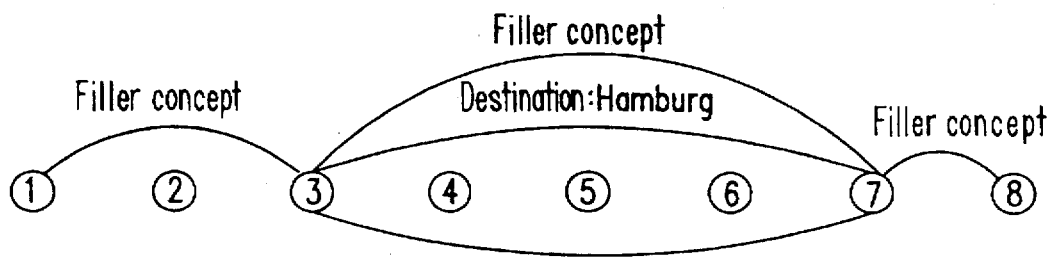

FIG. 5 shows an example of a concept graph thus obtained; it appears that in each case at least one path exists between the starting node and the end node; in actual cases involving actually spoken requests, however, a very large number of closed paths evidently exists between the starting node and the end node in the concept graph.

Because the scores of the edges, representing concepts with values, have been incremented by a speech model probability, the filler concept edges must also be adapted. This is carried out by associating each filler concept edge with a score which has been incremented by an additional score which is dependent on the length of the filler concept edge. A path through the concept graph whose sum of scores of the edges is minimum, is thus prevented from containing filler concept edges only.

This produces a concept graph wherethrough practically always a multitude of paths extend from the starting node to the end node. This multitude of paths occurs because of uncertainties in the recognition of the words from the speech signal. The scores assigned to the concept edges, parts of which have been taken over from the word graph as described whereas further parts indicate frequencies of the concepts, can then be used to search the best path through the concept graph, i.e. the sequence of concepts which most probably corresponds to the spoken request. Thus, this is the path on which the scores of the concepts situated thereon produce the smallest sum. In order to enhance the likelihood that the sequence of input items spoken in the request is indeed correctly represented thereby, however, further information can be used before that. This further information concerns the sequence of the concepts in the concept graph. This is because in the case of a naturally spoken request it is probable that given items are formed consecutively; for example, it is more likely that the items concerning time and date directly succeed one another than that they are separated by the indication of a railway station of departure or destination. Therefore, for concepts predetermined bigram probabilities are taken into account which also consider the beginning and the end of the sentence. Such bigram probabilities are independent of the number of meaningless words between two successive concepts. These bigram probabilities result in additional scores which are added to the scores at the individual edges in the concept graph.

A further improvement consists in that additionally there are provided concepts for meaningless but frequently used phrases such as "ich hätte gern" ("I would like") or "ich m öchte" ("please"). Evidently, no rules are assigned to such concepts and they do not provide any further input for the database enquiry. They just serve to cover further parts of the word graph and to reduce the risk of recognition of concepts in locations in which they were actually not present in the input speech signal.

Ultimately in the block 20 in FIG. 1, a concept graph is thus produced in which the best path with the smallest sum of the scores of the edges on this path reliably represents the actually spoken request. This concept graph, or the data representing the concept graph, is stored in the memory 24 for further processing.

However, for the time being only the most probable sequence of concepts can be derived from the concept graph, but the database enquiry requires the meaning of the concepts, i.e. the direct input of numbers or names. It is feasible to calculate these values during the search for the concepts and their introduction into the concept graph. In comparison with the recognition of the words, this requires only little additional effort and, moreover, these values are then available simultaneously for all concepts present in the concept graph and not only for the concepts on the best path. This may be attractive when these meaning values are also taken into account for the determination of the best path, for example in order to deal with excessive requirements or also contradictions.

The determination of the meaning from the spoken request, i.e. from the concept graph into which the request has meanwhile been converted, ultimately serves to determine the data necessary for the database enquiry. The attributed grammar used here serves to determine the meaning. The grammar comprises a set of rules for providing a given term, corresponding to a possible input item in the speech signal, with attributes via which one or more numerical values or names can be determined from the word graph. If no value can be derived from the speech signal for an attribute of a term, it is undefined. When an attribute occurring in a rule is undefined, the term overall is undefined. This property can be used, for example for the time. For example, the expressions "um X Uhr" ("at X o'clock") and "nach X Uhr" (after X o'clock) are syntactically similar and can be combined in one rule. However, because a time interval with starting instants and end instants s-zeit and e-zeit (s-time and e-time) are required for a database enquiry, the meaning of the time item in the speech signal, for the database enquiry, however, is different. It is only for the expression "um . . . " ("at . . . ") that both instants are known and identical.

An example of a rule, or a set of rules, for the term "Uhrzeit" (time) is given in the following Table:

| <Uhrzeit> | :: = (31.24) <prep> <Stunde> Uhr <Minute> |
|---|---|
| s_zeit | : = <1>.s_flag + <2>.zahl*60 + <4>.zahl |
| e_zeit | : = <1>.e_flag + <2>.zahl*60 + <4>.zahl |

```
<Stunde>     :: = (96.31)siebzehn
zahl         : = 17
<Minute>     :: = (94.07)dreiundzwanzig
zahl         : = 23
<prep>       :: = (12.16)um
s_flag       : = 0
e_flag       : = 0
<prep>       :: = (47.89) nach
s_flag       : = 0
```

In this respect it is assumed that the time itself was spoken as "17 Uhr 23" (17.23 hours). The numerical values enclosed by parentheses in the Table together provide the value for the already stated speech model probability whereby the score of the concept from the word graph is increased.

The determination of the date is slightly more complex, because more complex phrases such as "3 Tage vor Weihnachten" ("3 days before Christmas") or "diesen Monat noch" ("this month yet") may also occur. The term "Datum" (date) may also relate to a plurality of successive days in the case of travel schedule enquiry.

A date is composed of five natural numbers, that is to say the year, the month, the day in the month, the day of the week (counting from Monday) and the duration in days. For example, the statement "Freitag, der 22.1.93" ("Friday, 22.1.93") will produce the value or the value sequence 1993,01,22,5,1. It is important that each individual value may also be undefined by omission. The value sequence ",,,5,1" describes simply a non-defined Friday. On the other hand, incomplete statements in the date can often be supplemented on the basis of the instantaneous date; for example the statement "nächsten Freitag" ("next Friday") can be determined from the instantaneous date plus the difference between the number of the instantaneous day of the week and the number 5 for a Friday. In simplified form the same holds for the time; for example, for "vormittags" ("before noon") a fixed period of, for example from 9 till 12 o'clock can be assumed. From such statements an unambiguous set of values can thus always be derived for a database enquiry.

When in the block 30 the optimum path is selected from the concept graph which is stored in the memory 24 and which also contains the values of the individual concepts, i.e. the sequence of concepts, including filler concepts, which produces the smallest sum of the individual scores, however, problems could occur due to incorrect speech input or inaccurate recognition. For example, individual concepts such as, for example "Zielort" ("destination") could then be input or recognized several times; however, necessary concepts could also be completely absent. There are various causes in this respect:

The spoken sentence already contains contradictions or does not contain all necessary input items.

Recognition, i.e. formation of the word graph, has produced errors which affect not only the irrelevant filler words.

A phrase used by the speaker is not covered by the grammar and hence is not understood as having a meaning.

The path selected through the concept graph does not correspond to the optimum path.

These problems, however, can be solved by way of at least one of the following three steps:

1.) For example, double statement of a destination station, having the same name in both cases, produces merely the name of the destination station for the database enquiry. Furthermore, for example the time statement "früh" ("early") may mean the time interval from five o'clock until ten o'clock in the morning. The statement "acht Uhr" ("eight o'clock") may be interpreted as 8.00 hours or also as 20.00 hours. From the two input items together, however, the unambiguous time 8.00 o'clock in the morning can be determined.

2.) When similar concepts with different values still exist after the first step, all values but one are removed. Retained is only the value whose removal would most affect the probability value for the calculated path through the concept graph.

3.) However, if necessary values are missing, they are replaced by given assumptions. For example, if no departure station is stated, the site of the system will be entered. In the case of a missing date, the instantaneous date is assumed. Other missing values can be substituted in a similar manner.

The described system in accordance with the invention is thus capable of unambiguously determining the data for a database enquiry from most naturally spoken requests. This is executed in block 40 in FIG. 1 in which control data for controlling a memory 42 are formed from the values of the concepts on the optimum path through the concept graph determined in the block 30. The memory 42 contains a set of possible answers, i.e. the times of departure and arrival in the case of a timetable enquiry as well as possibly further timetable details. The answers read from the memory are converted into a complete sentence in the block 40 in as far as these answers do not already have the form of complete sentences; this sentence is converted into a speech signal and output via the loudspeaker 44. In the case of a telephone information system, evidently, a telephone link (not shown) exists between the block 40 and the loudspeaker 44 as well as between the microphone 10 and the block 12.

If no completely unambiguous database enquiry is obtained, even after application of the described steps for supplementing or eliminating details, given questions can be generated in dependence on missing or incorrect statements for which the memory 42 can also be used for this purpose. These return questions can be output to the person requesting information in order to obtain the missing or corrected statements after all.

I claim:

1. A system for outputting spoken information in response to input speech signals, comprising:

first means for comparing the speech signals with stored reference signals which correspond to words, and for outputting words determined by the comparisons, together with a score and with statements as regards starting point and end point for each word output, and for storing the words output with the statements in order to form a word graph from consecutive words, second means for replacing predetermined word sequences in the word graph by predetermined concepts with a score which is derived from the sum of the scores of the words of the word sequence replaced, and also with the same starting and end points as the relevant replaced word sequence in order to form a concept graph and for determining values from the replaced word sequences for the individual concepts in the concept graph, third means for determining a sequence of concepts from the concept graph on the basis of the scores, and fourth means for converting the values in the concepts of the sequence into data for a database enquiry in order to control a memory which contains predetermined words or word sequences, and for outputting selected word sequences in the form of complete sentences.

2. A system as claimed in claim 1, in which the first means are arranged to recognize speech pauses in the speech signal, to output these pauses with a score, and to replace each sequence of a word and a directly subsequent speech pause in the word graph by the word obtaining a supplemented score equal to the combination of the scores of the word and the speech pause.

3. A system as claimed in claim 1, in which the second means are arranged to generate additionally, for each concept, a filler concept and also a filler concept between pairs of two concepts in the concept graph which do not directly adjoin one another, each filler concept being given a score which is derived from the sum of the scores of the words in the word graph which have been replaced by the filler concept, no value being assigned to any filler concept.

4. A system as claimed in claim 3, in which the second means are arranged to supplement the score of the concepts in the concept graph by a concept-dependent additional score and the filler concepts by an additional score which is dependent on the length of the relevant filler concept.

5. A system as claimed in claim 4, in which the second means are arranged to supplement the score of the concepts in the concept graph by a score which is dependent on the combination of each concept with each directly preceding concept or with the directly preceding start of the speech signal.

6. A system as claimed in claim 1, in which the second means are arranged to replace further word sequences in the word graph by predetermined dummy concepts wherefrom no values can be determined for conversion into data for a database enquiry, at least one score being assigned to the dummy concepts.

7. A method for outputting spoken information in response to input speech signals, comprising the following steps:

comparing the speech signals with stored reference signals which correspond to words, and outputting words determined by the comparisons, together with a score and with statements as regards starting point and end point for each word output, and storing the words output with the statements in order to form a word graph from consecutive words, replacing predetermined word sequences in the word graph by predetermined concepts with a score which is derived from the sum of the scores of the words of the word sequence replaced, and also with the same starting and end points as the relevant replaced word sequence forming a concept graph and determining values from the replaced word sequences for the individual concepts in the concept graph, determining a sequence of concepts from the concept graph on the basis of the scores, and converting the values in the concepts of the sequence into data for a database enquiry in order to control a memory which contains predetermined words or word sequences, and outputting selected word sequences in the form of complete sentences.

8. A method as claimed in claim 7, in which speech pauses in the speech signal are recognized and output with a score, and each sequence of a word and a directly subsequent speech pause in the word graph is replaced by the word obtaining a supplemented score equal to the combination of the scores of the word and the speech pause.

9. A method as claimed in claim 7, in which additionally, for each concept, a filler concept is generated and also a filler concept between pairs of two concepts in the concept graph which do not directly adjoin one another, and each filler concept is given a score which is derived from the sum of the scores of the words in the word graph which have been replaced by the filler concept, and no value is assigned to any filler concept.

10. A method as claimed in claim 9, in which the score of the concepts in the concept graph are supplemented by a concept-dependent additional score and the filler concepts are supplemented by an additional score which is dependent on the length of the relevant filler concept.

11. A method as claimed in claim 10, in which the score of the concepts in the concept graph are supplemented by a score which is dependent on the combination of each concept with each directly preceding concept or with the directly preceding start of the speech signal.

12. A method as claimed in claim 7, in which further word sequences in the word graph are replaced by predetermined dummy concepts wherefrom no values can be determined for conversion into data for a database enquiry and to which at least one score is assigned.

* * * * *